(12) United States Patent
Cook et al.

(10) Patent No.: US 6,580,728 B1
(45) Date of Patent: Jun. 17, 2003

(54) LOCAL MULTI-POINT-DISTRIBUTION SYSTEM ARCHITECTURES

(75) Inventors: Charles I. Cook, Louisville, CO (US); Vladan Jevremovic, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/266,651

(22) Filed: Mar. 11, 1999

(51) Int. Cl.[7] .............................. H04J 1/00; H04Q 7/00
(52) U.S. Cl. ...................... 370/487; 370/536; 455/450; 359/123
(58) Field of Search ................... 370/352, 484, 370/486, 487, 485, 536; 455/422, 426, 427, 450, 453; 725/64, 68, 71, 126, 138, 144; 348/14.02, 384.1; 359/109, 123, 113, 115

(56) References Cited

U.S. PATENT DOCUMENTS 6,047,177 A  *  4/2000  Wickman ................... 455/422

\* cited by examiner

Primary Examiner—Alpus H. Hsu
Assistant Examiner—Afsar M. Qureshi
(74) Attorney, Agent, or Firm—Townsend and Townsend and Crew LLP

(57) ABSTRACT

A broadband communication system in which a central office is connected to a high speed network utilizes various LMDS architectures of the present invention to expand network capabilities. For example, LMDS architectures may extend the reach of the existing land line network, and reduce the cost of network expansion.

17 Claims, 1 Drawing Sheet

LOCAL MULTI-POINT-DISTRIBUTION SYSTEM ARCHITECTURES

TECHNICAL FIELD

The present invention relates to architectures for local multipoint distribution system (LMDS) applications.

BACKGROUND ART

Local multipoint distribution system (LMDS) in an existing architecture involves broadcasting microwave signals at frequencies at or above 28 Ghz to small receiver dishes, typically installed on the top of apartment buildings. At that high frequency, line-of-sight is required for maximum signal performance. The received LMDS signal may then be distributed through the building. LMDS technologies may also be used at lower frequencies to limit the strict line-of-sight limitations. In general, existing LMDS systems use the LMDS receiver to serve one customer or subscriber, with each different customer or subscriber having a dedicated LMDS receiver.

Although existing deployment of LMDS technologies has been quite limited, the higher frequencies and additional bandwidth associated therewith is not yet being utilized to its full potential. For the foregoing reasons, there is a need for LMDS architectures that overcome limitations of the prior art and utilize LMDS technologies to the fullest.

DISCLOSURE OF INVENTION

It is, therefore, an object of the present invention to provide a broadband communication system utilizing LMDS technologies to extend the reach of broadband service.

It is another object of the present invention to integrate LMDS technology into existing wireline networks to expand network capabilities, extending the reach of land line networks, and reducing the cost of current land line networks.

In carrying out the above objects, a broadband communication system is provided. The system comprises a central office connected to a high speed network, a local multipoint distribution system (LMDS) hub, a local multipoint distribution system (LMDS) remote terminal, and a plurality of customer digital signal lines connected to the remote terminal. The LMDS hub connects to an antenna that operates to transmit a signal. A fiber connects the central office to the hub to send the signal from the central office to the hub, allowing the antenna to transmit the signal. The remote terminal operates to receive the signal and further operates to separate the signal into a plurality of customer signals corresponding to a plurality of customers. Each customer digital signal line operates to send a customer signal to the corresponding customer.

Further, in carrying out the present invention, a broadband communication system comprises a central office, a local multipoint distribution system (LMDS), remote terminal, and a plurality of customer digital signal lines. The central office is connected to a high speed network and includes a local multipoint distribution system (LMDS) hub. The LMDS hub is connected to an antenna operative to transmit a signal. The remote terminal operates to receive the signal and further operates to separate the signal into a plurality of customer signals corresponding to a plurality of customers. The customer digital signal lines are connected to the remote terminal, and are operative to send a customer signal to the corresponding customer.

Still further, in carrying out the present invention, a broadband communication system comprises a central office connected to a high speed network, a local multipoint distribution system (LMDS) hub, and a local multipoint distribution system (LMDS) remote terminal. The LMDS hub includes an antenna operative to transmit a signal. A fiber connects the central office to the hub to send the signal from the central office to allow the antenna to transmit the signal. The remote terminal operates to receive the signal. A fiber connects the remote terminal to a network interface node operative to receive the signal and further operative to separate the signal into a plurality of customer signal corresponding to a plurality of customers. The signals are delivered with a plurality of customer digital signal lines connected to the node. Each customer digital signal line operates to send a customer signal to the corresponding customer.

Yet further, in carrying out the present invention, a broadband communication system in which a central office is connected to a high speed network is provided. The central office is connected to a network interface node with a plurality of customer subscriber lines connected thereto. The system comprises a local multipoint distribution system (LMDS) hub connected to an antenna operative to transmit a signal. The hub is connected to the central office. The system further comprises a local multipoint distribution system (LMDS) remote terminal. The remote terminal operates to receive the signal and further operates to send the signal to the network interface node, thereby increasing total bandwidth inflow to the network interface node to allow additional customer subscriber lines to be connected thereto.

The advantages associated with embodiments of the present invention are numerous. For example, systems of the present invention provide architectures for LMDS applications for high and low speed data services, in addition to allowing integration of LMDS technology into existing wireline networks. As such, LMDS technology in accordance with the present invention may be utilized to extend the reach of land line networks, advantageously reducing the cost of current land line networks. Further, although LMDS technologies are generally utilized in the gigahertz frequency range, lower frequencies may be used as appropriate for a particular application, depending on the needed distance between the broadcasting and receiving antennas, and other conditions as appreciated by one of ordinary skill in the art. Further, the high bandwidth of LMDS technologies makes embodiments of the present invention useful for data, voice, and combinational transmissions including both voice and data.

The above objects and other objects, features, and advantages of the present invention, are readily apparent from the following detailed description of the best mode for carrying out the invention when taken in connection with the accompanying drawings.

BEST MODE FOR CARRYING OUT THE INVENTION

Figure 1:
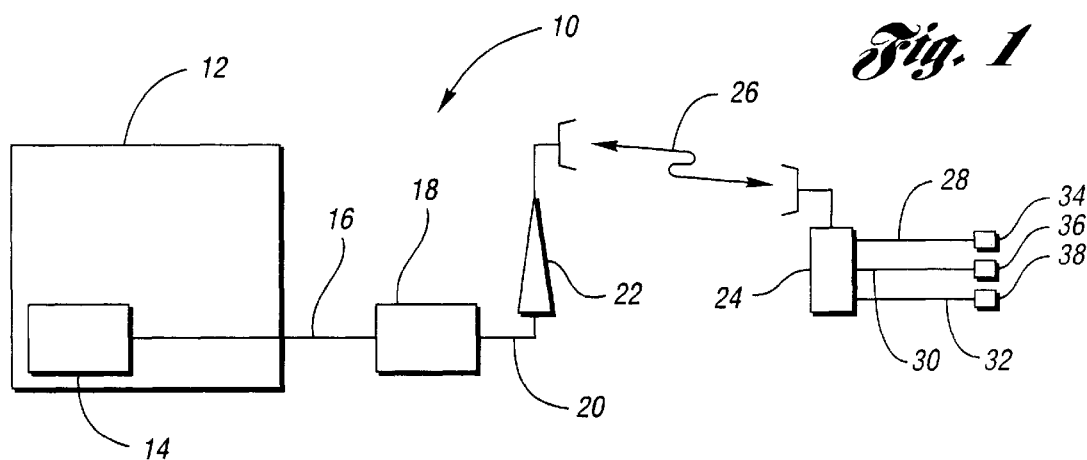
FIG. 1 is a broadband communication system utilizing a first LMDS architecture of the present invention.

With reference to FIG. 1, a broadband communication system of the present invention is generally indicated at 10.

System 10 includes a central office 12 with a connection 14 to a high speed network (not shown). A suitable high speed network is an asynchronous transfer mode (ATM) network. Connection 14 is connected by a fiber 6 to a local multipoint distribution system (LMDS) hub 18. Fiber 16 is used to send a signal from central office 12 to LMDS hub 18. As such, the signal may be routed along line 20 to a 22, which in turn transmits the signal. In one suitable implementation, line 20 is coaxial cable. Tower antenna 22 transmits the signal which is received by a local multipoint distribution system (LMDS) remote terminal 24. LMDS remote terminal 24 and tower antenna 22 communicate in preferably two-way communication as indicated by double arrow 26. Remote terminal 24 operates to separate the received signal into a plurality of customer signals corresponding to a plurality of customers. Each customer is served by a separate digital signal line 28, 30, 32. Customers signal lines 28, 30, 32 connect to customer sites 34, 36, 38, respectively. Of course, it is to be appreciated that digital signal lines 28, 30, 32 may take a variety of forms. For example, in preferred embodiments of the present invention, the digital signal lines of this LMDS architecture and other LMDS architectures of the present invention are xDSL (of which VDSL is a suitable category thereof), and DS lines such as DS0 and DS1 lines.

Figure 2:
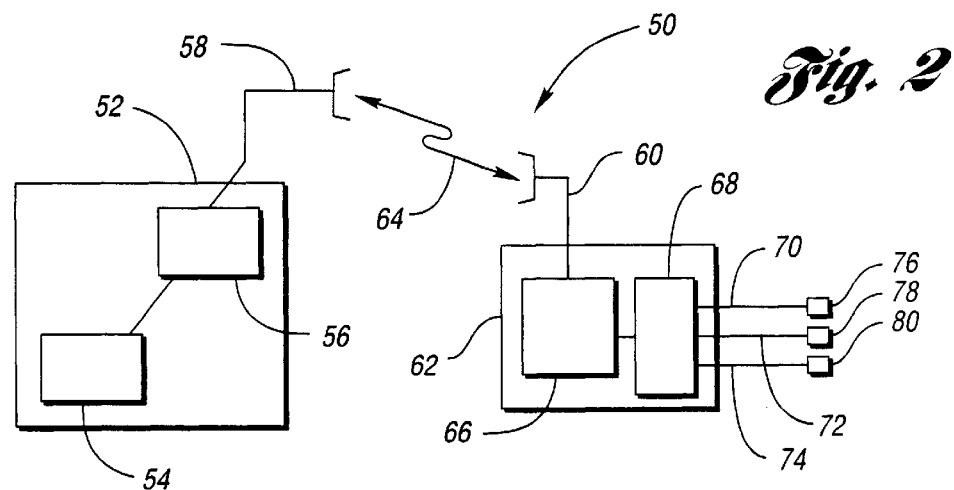
FIG. 2 is a broadband communication system utilizing a second LMDS architecture of the present invention.

With reference to FIG. 2, a broadband communication system made in accordance with the second embodiment of the present invention is generally indicated at 50. System 50 includes a central office 52 with a connection 54 to a high speed network (not shown), and including an LMDS hub 56. LMDS hub 56 is connected to an antenna 58. Antenna 58 is operative to transmit a signal. Antenna 58 transmits the signal for reception by receiving antenna 60 at LMDS remote terminal 62. Preferably, system 50 is configured for two-way communication as indicated by double arrow 64.

Remote terminal 62 is shown in greater detail than remote terminal 24 (FIG. 1); but, of course, it is to be appreciated that various arrangements for the internal workings of the remote terminals are apparent to and appreciated by those skilled in the LMDS communications art. Remote terminal 62 includes an LMDS modem 66 to convert the radio frequency signal to a digital signal, and is connected to a multiplexer 68. Depending on what types of drops extend from multiplexer 68, multiplexer 68 may take a variety of forms, such as for example, a digital subscriber line access multiplexer (DSLAM) or a traditional demultiplexer for use with DS0 standard two wire twisted pairs. A plurality of customer digital signal lines, with separate lines indicated at 70, 72, 74 connect to customer sites 76, 78, 80, respectively.

Figure 3:
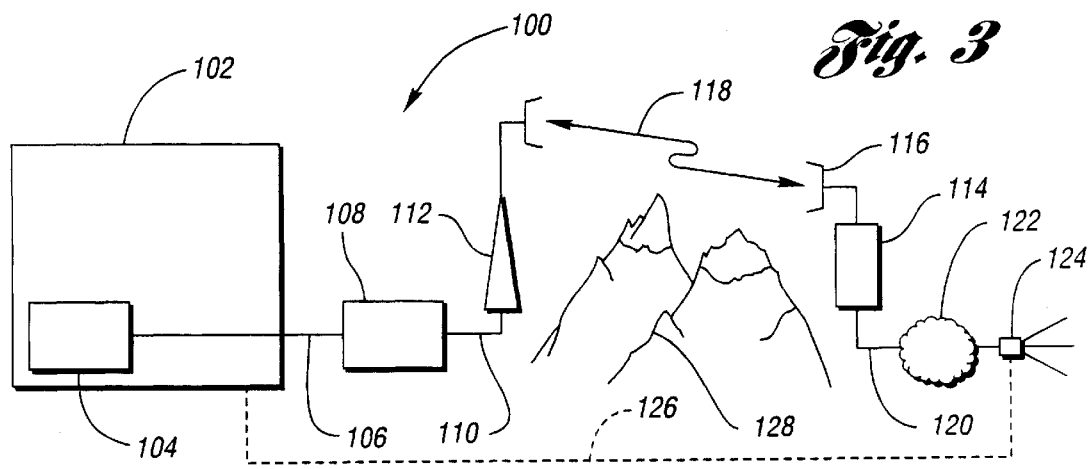
FIG. 3 is a broadband communication system utilizing a third LMDS architecture of the present invention, and further illustrates LMDS architecture supplementing an existing wireline network (shown in dashed line).

In FIG. 3, a third LMDS architecture of the present invention is utilized in broadband communication system 100. System 100 includes a central office 102 with a connection 104 to a high speed network (not shown), with a fiber 106 connected in between central office 102 and an LMDS hub 108. LMSD hub 108 connects along line 110 to tower antenna 112. Tower antenna 112 transits the signal to LMDS remote terminal 114 which has receiving antenna 116. Preferably, two-way communication is allowed as indicated by double arrow 118. Of course, it is to be appreciated that although two-way communication is preferred so that data and voice information may be routed in both directions through the LMDS architecture, there may be some embodiments wherein only one way communication through the LMDS architecture need be utilized because other existing network portions provide the other direction of communication thereby creating a complete path.

Remote terminal 114 connects through a fiber 120 into network 122, and eventually to an interface node 124. In this embodiment, an LMDS architecture of the present invention may be utilized to expand the capabilities of an existing wire line network, indicated in hidden line at 126. That is, additional bandwidth demand may arise at network interface node 124, requiring the system provider to find a way to increase total bandwidth inflow to node 124. In accordance with the present invention, an LMDS architecture may be utilized as an alternative to the expensive laying of fiber by instead providing an LMDS link from a new LMDS hub. Still further, in accordance with the present invention, LMDS architectures may be utilized to overcome obstacles that would make the laying of fiber difficult or very costly. For example, rough terrains such as mountains 128 may make it very difficult to cost effectively lay down fiber optic line from central office 102 to network node 124. As such, placement of tower antenna 112 within line of site of receiving antenna 116 allows LMDS technologies to greatly reduce the cost of providing additional bandwidth inflow (or outflow) to (and from) network node 124. Further, of course, line-of-sight restrictions may be reduced by utilizing lower frequencies as required, but most likely with a bandwidth trade off.

While the best mode for carrying out the invention has been described in detail, those familiar with the art to which this invention relates will recognize various alternative designs and embodiments for practicing the invention as defined by the following claims.

What is claimed is:

1. A broadband communication system comprising:
   a central office connected to a high speed network and in communication with a network interface node through a connection;
   a local multipoint distribution system hub connected to an antenna operative to transmit a signal;
   a fiber connecting the central office to the hub to send the signal from the central office to the hub to allow the antenna to transmit the signal;
   a local multipoint distribution system remote terminal operative to receive the signal and further operative to send the signal to the network interface node, wherein the received signal augments the connection between the central office and the network interface node, thereby increasing total bandwidth inflow to the node to allow additional customer subscriber lines to be connected thereto, and wherein the network interface node is operative to separate the signal into a plurality of customer signals corresponding to a plurality of customers; and
   a plurality of customer digital signal lines connected to the network interface node, each customer digital signal line being operative to send a customer signal to the corresponding customer.

2. The broadband communication system of claim 1 wherein the plurality of customer digital signal lines are xDSL.

3. The broadband communication system of claim 1 wherein the hub and the remote terminal are configured for two-way communication between each customer digital signal line and the central office.

4. A broadband communication system comprising:
   a central office connected to a high speed network and in communication with a network interface node through a connection, wherein the central office includes a local multipoint distribution system hub connected to an antenna operative to transmit a signal;
   a local multipoint distribution system remote terminal operative to receive the signal and further operative to send the signal to the network interface node, wherein the received signal augments the connection between the central office and the network interface node, thereby increasing total bandwidth inflow to the node to allow additional customer subscriber lines to be connected thereto, and wherein the network interface node is operative to separate the signal into a plurality of customer signals corresponding to a plurality of customers; and a plurality of customer digital signal lines connected to the network interface node, each customer digital signal line being operative to send a customer signal to the corresponding customer.

5. The broadband communication system of claim 4 wherein the plurality of customer digital signal lines are DS0 lines.

6. The broadband communication system of claim 4 wherein the plurality of customer digital signal lines are DS1 lines.

7. The broadband communication system of claim 4 wherein the hub and the remote terminal are configured for two-way communication between each customer digital signal line and the central office.

8. A broadband communication system comprising:

a central office connected to a high speed network and in communication with a network interface node through a connection;

a local multipoint distribution system hub including an antenna operative to transmit a signal;

a fiber connecting the central office to the hub to send the signal from the central office to the hub to allow the antenna to transmit the signal;

a local multipoint distribution system remote terminal operative to receive the signal; and a fiber connecting the remote terminal to the network interface node, wherein the network interface node is operative to receive the signal and further operative to separate the signal into a plurality of customer signals corresponding to a plurality of customers to be delivered with a plurality of customer digital signal lines connected to the node, each customer digital signal line being operative to send a customer signal to the corresponding customer, and wherein the received signal augments the connection between the central office and the network interface node, thereby increasing total bandwidth inflow to the node to allow additional customer subscriber lines to be connected thereto.

9. A broadband communication system in which a central office is connected to a high speed network and is in communication with a network interface node through a connection, the node having a plurality of customer subscriber lines connected thereto, the system further comprising:

a local multipoint distribution system hub connected to an antenna operative to transmit a signal, the hub being connected to the central office;

a local multipoint distribution system remote terminal operative to receive the signal and further operative to send the signal to the node, wherein the received signal augments the connection between the central office and the node, thereby increasing total bandwidth inflow to the node to allow additional customer subscriber lines to be connected thereto.

10. The broadband communication system of claim 9, wherein the plurality of customer subscriber lines are xDSL.

11. The broadband communication system of claim 9, wherein the hub and the remote terminal are configured for two-way communication between each customer subscriber line and the central office.

12. The broadband communication system of claim 9, wherein the antenna is operative to transmit using lower frequencies as necessary to avoid line-of-sight restrictions.

13. The broadband communication system of claim 9, wherein the signal is selected from the group consisting of voice, data, and a combination of voice and data.

14. The broadband communication system of claim 9, wherein communication between the local multipoint distribution hub and the local multipoint distribution remote terminal is one-way communication, and wherein the connection between the central office and the node provides communication in an opposite direction.

15. The broadband communication system of claim 9, wherein the plurality of customer subscriber lines are DS0 lines.

16. The broadband communication system of claim 9, wherein the plurality of customer subscriber lines are DS1 lines.

17. The broadband communication system of claim 9, wherein the hub and the remote terminal are configured for two-way communication between each customer digital signal line and the central office.

* * * * *